United States Patent
Collet

(10) Patent No.: US 7,251,825 B2
(45) Date of Patent: Jul. 31, 2007

(54) METHOD TO USE A VIRTUAL PRIVATE NETWORK USING A PUBLIC NETWORK

(75) Inventor: Daniel Collet, Lausanne (CH)

(73) Assignee: Nagravision S.A., Lausanne (CH)

( * ) Notice: Subject to any disclaimer, the term of this patent is extended or adjusted under 35 U.S.C. 154(b) by 911 days.

(21) Appl. No.: 10/206,363

(22) Filed: Jul. 29, 2002

(65) Prior Publication Data

US 2003/0021422 A1    Jan. 30, 2003

(30) Foreign Application Priority Data

Jul. 30, 2001    (CH) .................................. 1424/01

(51) Int. Cl.
*H04L 29/00*    (2006.01)
(52) U.S. Cl. .............. 726/5; 726/3; 726/4; 726/7; 726/15; 380/201; 380/202; 380/203
(58) Field of Classification Search ................ 713/165, 713/156, 163, 161, 173, 176; 380/201–203, 380/25, 282; 726/1–7, 27–32
See application file for complete search history.

(56) References Cited

U.S. PATENT DOCUMENTS

| 5,588,060 A | 12/1996 | Aziz |
| 5,764,918 A | 6/1998 | Poulter |
| 6,147,995 A | 11/2000 | Dobbins et al. |
| 6,938,155 B2 * | 8/2005 | D'Sa et al. ................. 713/160 |
| 6,940,977 B1 * | 9/2005 | Manabe ....................... 380/232 |
| 6,978,021 B1 * | 12/2005 | Chojnacki .................... 380/202 |
| 7,036,019 B1 * | 4/2006 | Saito ........................... 713/193 |
| 2002/0026574 A1 * | 2/2002 | Watanabe et al. ............ 713/155 |

FOREIGN PATENT DOCUMENTS

EP    0677949 A2 *    3/1995

* cited by examiner

*Primary Examiner*—Kambiz Zand
*Assistant Examiner*—Tongoc Tran
(74) *Attorney, Agent, or Firm*—Harness, Dickey & Pierce, P.L.C.

(57) ABSTRACT

Example embodiments relate to exchanging data between several computers or multimedia units through a public network while guaranteeing at the same time the confidentiality of these data. Specifically, the creation and use of a virtual private network (VPN) is disclosed. The virtual private network (VPN) may have a plurality of units connected to a public network, each unit having a security device which may have a unique number UA1. The method may include generating a right Dn associated to the unique number UAn, by the security device of a unit Un, transferring the right Dn to the security device of at least one second unit Um, encrypting the data sent by unit Un and the description of the Dn right by a encryption data key KS, and receiving the encrypted data by the second unit Um, wherein the encrypted data is presented to the security device of the second unit Um to verify if the right Dn is present, and if the right Dn is present, then decrypting the data by the encryption data key KS.

19 Claims, 2 Drawing Sheets

METHOD TO USE A VIRTUAL PRIVATE NETWORK USING A PUBLIC NETWORK

Example embodiments relate to a domain of telecommunication networks, in particular a creation of a private network inside a public network.

These networks may be known under the name "Virtual Private Network" (VPN).

BACKGROUND

It is known that security connection will be established between two points across a public network using an exchange protocol of keys for the creation of a security connection. Such a protocol is described as SSL which is based on the data exchange thanks to a pair of keys, the public key and the private key for the definition of a symmetrical session encryption key. The data is codified by this session key, the latter being used only for this transaction.

This function can only be developed between two interlocutors and thus cannot allow the formation of a network for several users. In fact, it is necessary to have the same quantity of unities of dialogue as computers to connect.

The need to create such networks is present when one wishes to link several distant points but connected to a same public network such as Internet.

This need goes together with effective protection of the exchanged data because when one connects on the Internet, confidentiality is not guaranteed.

In this way an unsolved problem remains which consists of linking several computers or multimedia units through a public network at the same time guaranteeing the confidentiality of that data.

SUMMARY

This aim is reached by a method for creating and using a virtual private network (VPN) having a plurality of units connected to a public network, each unit having a security device which includes a unique number UA. The method may be characterized by the following steps:
  generating a right Dn associated to the unique number UAn, by the security device of a unit Un,
  transferring this right Dn to the security device of at least one second unit Um,
  encrypting the data sent by unit Un and the description of the Dn right by a encryption data key KS, and
  receiving the encrypted data by the second unit Um, present these encrypted data to the security device of the second unit Um, verifying if the right Dn present and if this is the case, decrypting the encrypted data by the encryption data key KS.

When unit U2 wants to communicate with unit U1, it carries out the same operation using the right D1 as an identifier and unit U1 can receive the data because it contains this right.

When unit U1 sends its right D1 to a third unit U3, the same principle applies between unit U1 and U3 but also between unit U2 and unit U3. They use the right D1 initiated by unit U1 to authorize decryption of the data.

Thus, we can see that a spontaneous network has been created whose administrator is unit U1, that which has created the first right.

We can divide the units into two categories, either the generating units such as unit U1 or the participating units such as U2 and U3.

It should be noted that if unit U2 wants to communicate with unit U1 without allowing unit U3 to decrypt the data, unit U2 also becomes a generating unit and sends a D2 right to unit U1. A second virtual network has been created between units U1 and U2.

Practically, these security means can present themselves in several forms. To assure high security in the mechanism of encryption/decryption, specialized microprocessors which contain encryption engine and data such as the security keys are used.

These microprocessors are supplied in the form of a microchip card with a Plug-in SIM or ISO 7816-2 format.

According to a first embodiment of the invention, the network card of the units contains the aforementioned microchip card, for example in the same way as a GSM phone. The data are directly processed on the network card and the work is done in a transparent way.

The user of unit U2, at the moment of data issue, will only have to select the network through which the encryption must be done. In fact, it is possible that unit U2 is part of several networks (for example U1 and U3) and so a selection must be made.

The sending of the right D1 to another unit is an operation which requires great care. In fact, it is necessary to be sure that this right is only loaded in the units desired by U1. Because of this, there are several solutions:
  unit U1 gains access to the public key of unit U2 to decrypt the right D1 and send it to unit U2. This right can only be decrypted by U2 thanks to its private key. The other units, which do not possess the private key of unit U2, cannot decrypt the right D1.
  the initialisation protocol in the security means requires the introduction of a password. Unit U1, at the moment of the generation of the right D1, asks the user to introduce a password which is associated to the right under an encrypted form. This right D1 is sent to unit U2, and when the user of U2 wants to load this right in the security means, the latter requests the introduction of the password. Thanks to the secret key contained in all the security modules, the password is controlled with that contained in right D1 and the right is only loaded if the passwords are identical. The password is transmitted between U1 and U2 by other means for example by phone. A variant of this solution consists in sending the right D1 mixed with a large number of filling data. The password is then used as an addressing key to extract the right D1 inside these superfluous data.
  a simple and effective means is to load the right D1 on a removable base such as a floppy disk and send it to U2.
  the host apparatus of the security means disposes of a second location in which it is possible to place a second security means. The transfer is made from one means to another in a very restricted environment.

In order to prevent the right D1 from being loaded in other units than U2, it is possible to generate the right D1 and to associate it to the unique number of U2 (that is UA2). The right D1 is therefore associated with the unique number UA2 (for unit U2) and sent to this unit. If other security means (Un) attempt to load this right (with the password for example), a verification is done in order to control if the unique number UAn corresponds to that number associated to the right D1.

The keys used during the different transactions play an important role. For key encryption of those data, several variants can be used.

According to a first embodiment, the security means comprise a secret key which is common to all the security means. This key can be of an asymmetrical (RSA) or symmetrical type (DES, CAST, IDEA).

According to a second variant, the security means of unit U1 generate a key of encryption/decryption K1, which is encrypted by the service key K0 and sent with the right D1 according to the above mentioned modalities. In this way, there will be as many different keys as the virtual network. A unit which participates with three networks is therefore going to store three different encryption keys.

In a more elaborated form of the invention, it is possible that unit U1 wishes to transmit data with U3, without U2, also part of its network, being able to read this information.

This is why, when U1 generates the right D1, a network index is added. This index may be kept on some bits if one wishes to limit the number of networks created by U1 to 256 for example. On the side of unit U2, if it participates in several networks initiated by U1, it will not duplicate the right D1 but just the index of the network.

After the transmission phase of this right to unit U2, the security means proceed to the verification of the right and the index. It is important to remember that those data are stored in a crypto-processor and cannot be modified by the user.

In this way it will be much easier for unit U1 to manage the different networks created.

Example embodiments also extend to a centralized management system of rights. All the units may be linked (or can be at a given moment) to a managing center. When a unit requires the creation of a network R1, it may send this request to the managing center.

The latter verifies if the unit is authorized to do this operation and in an affirmative case, it will send the right D1 to unit U1 as well as a key K1 common to the network R1.

When unit U2 wishes to participate in this network, unit U1 transmits the right D1 or a part of this right to unit U2 according to the modalities already mentioned above. With this right, unit U2 can apply to the managing center in order to receive the key K1 and the right D1 as a whole.

If reference is made here to a part of the right D1 which is transferred from unit U1 to unit U2, this comes from the fact that the right D1 is transmitted totally to unit U2 by the managing center. One can imagine that when the network R1 is created, unit U1 attributes a password to it. This password, representative of right D1 is transmitted to unit U2 which presents it to the managing center itself.

The managing center verifies the password and if it is correct, the right D1 is transmitted to unit U2.

The interest of using a managing center is the dynamic management of such a network. In fact, the problem of radiation of part of a network can occur at any time. Furthermore, a high security level involves the frequent change of the encryption keys.

These functions are available through the managing center which can coordinate a change of key for a given network. The new key is transmitted to all the units of this network thanks to the protected connection which links all the units to the managing center. This kind of data is transmitted encrypted with addressee the unique number of each unit. Thus, it is possible to withdraw a part of the group by stopping transmitting the updated keys. The managing center can radiate a part by sending a deactivation order of the right.

BRIEF DESCRIPTION OF THE DRAWINGS

Example embodiments will be readily understood with reference to the following detailed description which refers to annexed drawings which are given as a non limitive example, i.e..

DETAILED DESCRIPTION OF EXAMPLE EMBODIMENTS

Figure 1:
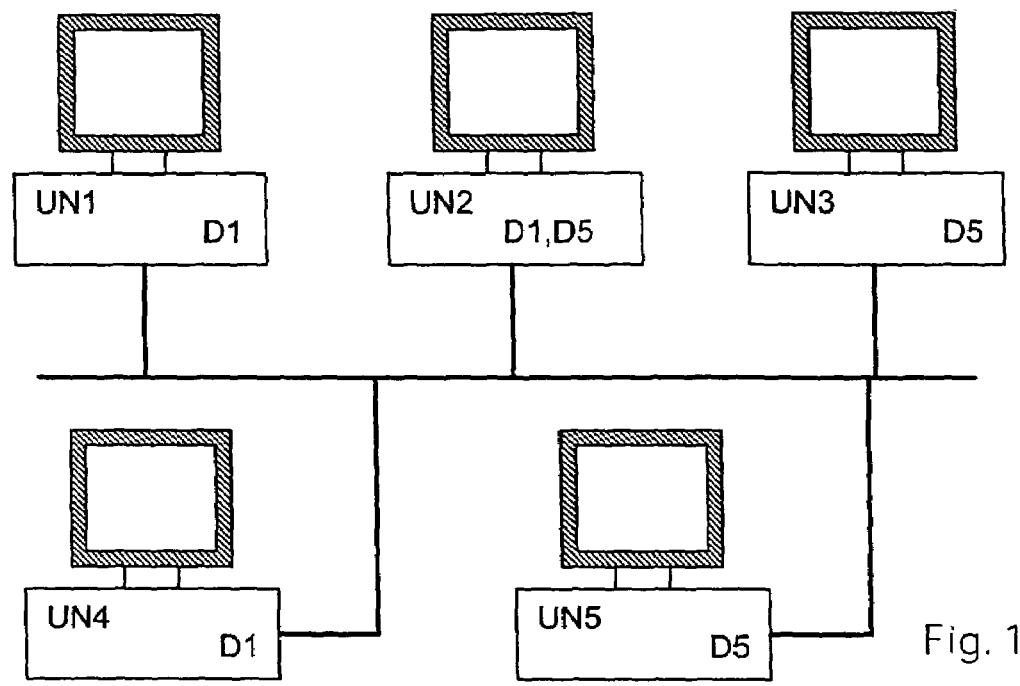
FIG. 1 describes a network without managing center at a unique level.

FIG. 1 illustrates 5 identified units UN1 to UN5. Each unit contains security means in which there is a crypto-processor in charge of generation and management of the rights.

According to our example, unit UN1 generates the D1 right that it sends to units UN2 and UN4.

In parallel, unit UN5 generates a right D5 that it sends to units UN2 and UN3.

We have a first network formed by units UN1, UN2 and UN4 as well as a second network formed by units UN2, UN3 and UN5. Unit UN2 must select the network it wishes to work on because it disposes of both rights.

When data are exchanged between these different units, there are two ways of operating. According to a first embodiment, the secret key contained in the security means (or that generated with the right) is used to encrypt all the transferred contents between the different units. Another way consists of using a session key.

This random session key KS is generated by the transmitting unit, and is used to encrypt the data. For operational reasons of quickness, this key is a symmetrical type. The transmitting unit has a control data block that consists of the session key KS and the definition of the right necessary for the decryption of the data. This block is encrypted by a common service key to the units, or by the key generated with the right D.

At the time of reception, the control block is treated by the security means before the treatment of the data. These means will therefore decrypt the control block and verify if the required right is present in this unit. In an affirmative case, the session key KS is applied to the data that allows them to be decrypted.

Figure 2:
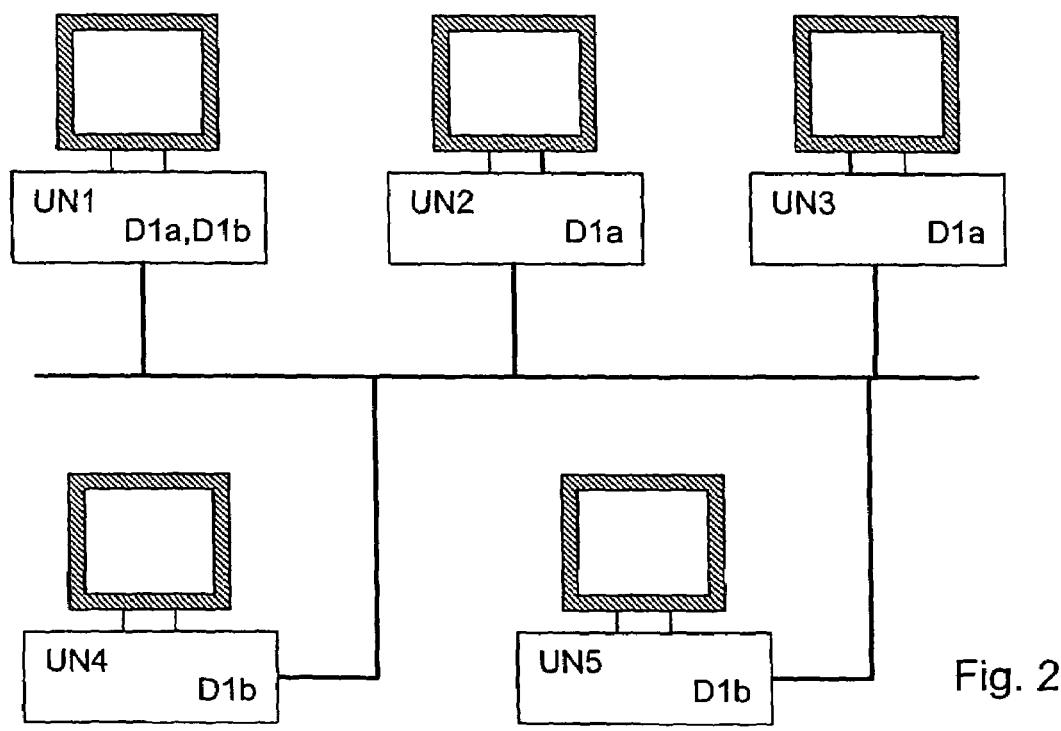
FIG. 2 describes a network without managing center at several levels.

FIG. 2 illustrates a variant in which unit UN1 has generated two rights to create two networks, D1a and D1b. A first network is created between the units UN1, UN2 and UN3 while a second network is created between units UN1, UN4 and UN5.

This variant permits great flexibility in confidential data diffusion choosing that which can encrypt the data. In fact, as the transmission network is a public one, it can be considered that the data are accessible to all the units that have the right when the connection is done from one unit to the other.

Figure 3:
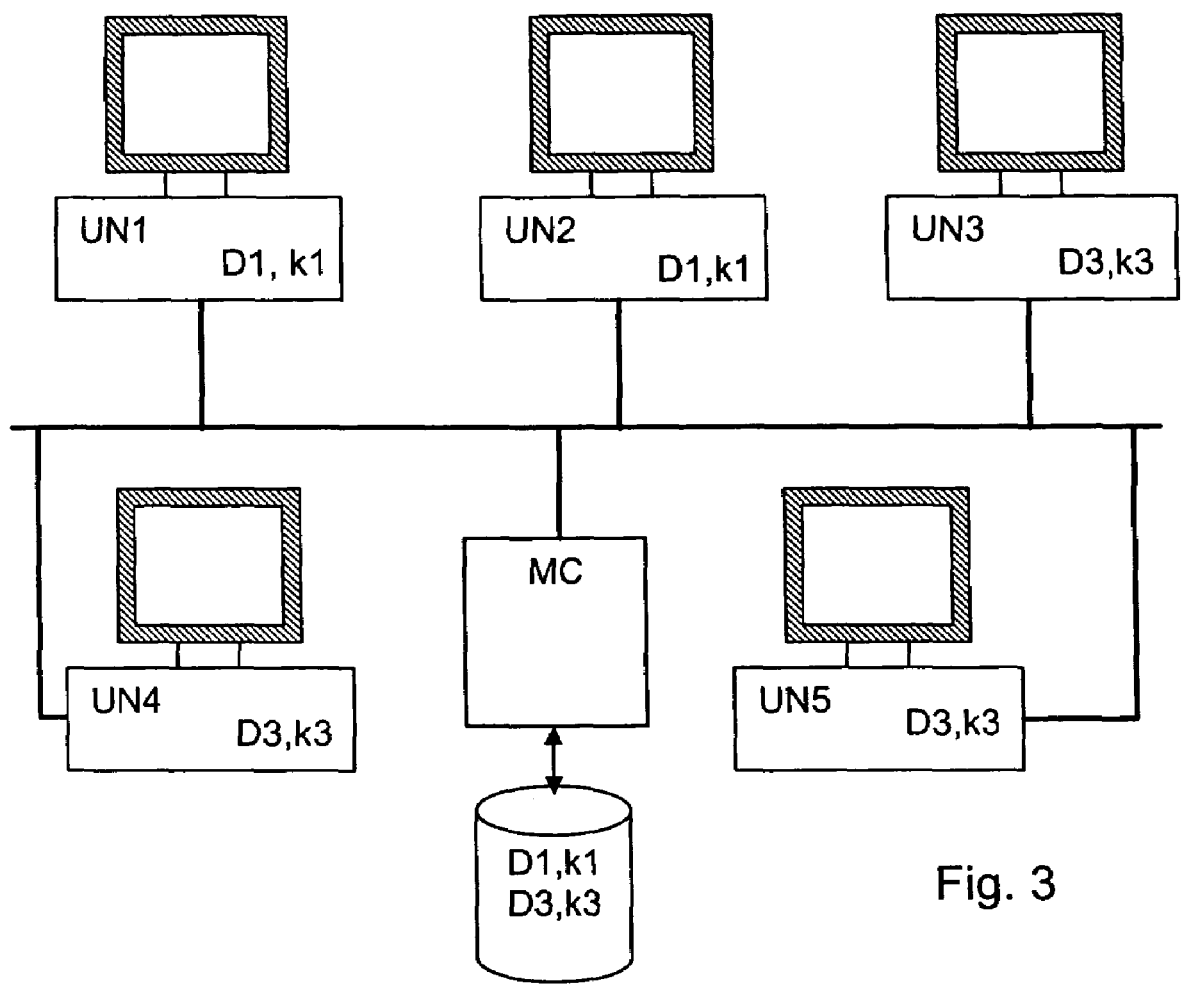
FIG. 3 describes a network without managing center.

FIG. 3 represents the variant with a managing center MC. Unit UN1 requires the right D1 from the MC center as well as from the encryption key k1. The managing center records the creation of the network R1 in its database. To participate in this network, unit UN2 must also receive this right D1. Because of this, the method used can be the one described above or it can receive support from the managing center. In fact, according to a particular protocol, unit UN1 can communicate the direction of the units with which it wishes to create the R1 network. The managing center MC, thanks to the secured telecommunications means that it includes, will transfer the right D1 to all the concerned units as well as the encryption/decryption key k1. In a similar way, if unit UN3 wishes to create a network R3, it asks the managing center to assign it the network R3 associated to the right D3.

Knowledge of all the units participating in a given network is important for the regular change of the encryption keys. The managing center MC can change the keys in the units at regular intervals (or pseudo-random) to avoid using the same key too long and therefore making it vulnerable.

The change of key is also useful to eliminate part of the network participants. The generating unit UN1 informs the managing center MC that the unit UNn is no longer part of the network D1 and the center stops communicating the new keys. Alternatively or as a complement it can send a deactivation order to this unit.

This key K1 can be a symmetrical or asymmetrical type. In the second case, each unit has two public and private keys and on being encrypted or decrypted, one key or the other will be used.

At the time of data transmission, these are generally encrypted by a session key generated randomly. This key is then encrypted by key K1 before it is transmitted to other units.

According to another embodiment of the invention, the units UN are pay television decoders and the security means are made up by smart cards. These decoders are also used to receive and send data for electronic messages for example. It is also possible to connect such a decoder to a computer to take advantage of the interface with a high-speed network on one hand and the security of the transactions on the other hand.

According to a particular embodiment, the right D includes a validity field. So, each unit which receives this right has a validity period. The present date is added to each data exchange (see control block above). It is reminded that this control block is encrypted.

The security means verify the compliance of the validity of the right D with the date contained in the control block. If it is out of date, the decryption of the data is not carried out. According to the method chosen, whether it is with a master unit, or with a managing center, it is foreseen to renew the validity before its deadline, in case that the administrator of the right is willing to do it for the unit concerned. This renewal is carried out by sending a control message to the units concerned with the description of the right and the new validity. Once the validity is exceeded, the right cannot be extended anymore and a new transmission procedure of the right, as described above, is necessary.

The invention claimed is:

1. A method to use a virtual private network (VPN) having a plurality of units connected to a public network, each unit having a security device which includes at least a unique number UA, said virtual private network including a first unit generating a right Dn associated to the unique number UAn and at least one second unit Um, the security device of the at least one second unit receiving the right Dn from said first unit, the method comprising:
   encrypting the data sent by unit Un and a description of the right Dn necessary for the decryption of the data, by an encryption data key KS,
   creating a control data block that includes the encryption data key KS and the description of the right necessary for the decryption of the data,
   receiving the encrypted data and the description of the right Dn by the at least one second unit Um, and receiving the control data block by the at least one second unit Um, and
   presenting the encrypted control data block to the security device of the at least one second unit Um to verify if the right Dn is present in the security module of the at least one second unit,
   wherein if the right Dn is present, then using the encryption data key KS to decrypt the encrypted data.

2. The method according to claim 1, wherein the right Dn is associated to an identifier of the at least one second unit Um, and the security device of the second unit verifies if the right Dn is destined for the second unit.

3. The method according to claim 1, wherein a network index Ra is associated with the right Dn by the unit Un, and affiliation of another second unit Um is based on a criteria of the right Dn and the network index Ra.

4. The method according to claim 2, wherein a network index Ra is associated with the right Dn by the unit Un, and affiliation of another second unit Um is based on a criteria of the right Dn and the network index Ra.

5. The method according to claim 1, wherein the encryption data key KS is a session key of symmetrical type and randomly generated, the session key being encrypted by a first key Kn, and the encryption session key KS being transmitted to the at least one second unit Um.

6. The method according to claim 1, wherein the encryption data key KS is a first key Kn common to a set of security device.

7. The method according to claim 5, wherein the first key Kn is generated with the right Dn and transmitted to participating units by a secret service key K0 common to the units.

8. The method according to claim 6, wherein the first key Kn is generated with the right Dn and transmitted to participating units by a secret service key K0 common to the units.

9. The method according to claim 1, wherein the right Dn has a validity field, and further comprises:
   adding, by the unit Un, an indication of a present date in encrypted form to a description of the right Dn, and
   receiving the indication by the at least one second unit Um and verifying by the security device of the at least one second unit Um if the date is within the validity range of the right Dn.

10. The method according to claim 2, wherein the right Dn has a validity field, and further comprises:
   adding, by the unit Un, an indication of a present date in encrypted form to a description of the right Dn, and
   receiving the indication by the at least one second unit Um and verifying by the security device of the at least one second unit Um if the date is within the validity range of the right Dn.

11. The method according to claim 5, wherein the right Dn has a validity field, and further comprises:
   adding, by the unit Un, an indication of a present date in encrypted form to a description of the right Dn, and
   receiving the indication by the at least one second unit Um and verifying by the security device of the at least one second unit Um if the date is within the validity range of the right Dn.

12. A method to use of a virtual private network (VPN) including a plurality of units connected to a managing center (MC) through a public network, each unit having a security device which includes at least a unique number UA, said virtual private network being created by requesting the creation of a network Rn through a unit Un at the managing center (MC), by sending a right Dn and a key Kn representing the network Rn to unit Un by the managing center (MC), by requesting the registration of at least a second unit Um as part of the network Rn, at the managing center (MC), by transmitting the right Dn and the key Kn to the second unit Um, the method comprising:

encrypting the data sent by the unit Un and the description of the right Dn necessary for the decryption of the data by an encryption data key KS, creating a control data block that includes the encryption data key KS and the description of the right Dn necessary for the decryption of the data, receiving the encrypted data and the description of the right Dn by the at least one second unit Um, and receiving the encrypted control data block by said at least one second unit Um, and decrypting the control data block and presenting said control data block to the security device of the at least one second unit Um to verify if the right Dn is present, and if the right Dn is present, then decrypting the control data block to obtain the encryption data key KS and then decrypt the data with the encryption data key Ks.

13. The method according to claim 12, wherein the encryption data key KS is of a symmetrical type and is generated randomly, the key being encrypted by the first Kn key, and the encrypted session key being transmitted to the second unit Um.

14. The method according to claim 12, wherein the request of the registration of the second unit Um further comprises:

transmitting a part representing the right Dn by unit Un, presenting the part of the right Dn at the managing center by unit Um, verifying the managing center (MC) that the part corresponds to the right Dn, and transmitting the right Dn and the key Kn to the second unit Um if the right Dn is verified.

15. The method according to claim 13, wherein the request of the registration of the second unit Um further comprises:

transmitting a part representing the right Dn by unit Un, presenting the part of the right Dn at the managing center by unit Um, verifying the managing center (MC) so that the part corresponds to the right Dn, and transmitting the right Dn and the key Kn to the second unit Um if the right Dn is verified.

16. The method according to claim 12, wherein the request of the registration of the unit Um further comprises:

transmitting an identifier of the second unit Um to the managing center (MC) by the second unit Um, and transmitting the right Dn and the key Kn to the second unit Um by the managing center.

17. The method according to claim 12, wherein the managing center (MC) sends a new key Kn' to members of the same network Rn at a pseudo-random interval.

18. The method according to one of the claim 13, wherein the managing center (MC) sends a new key Kn' to members of the same network Rn at a pseudo-random interval.

19. The method according to claim 14, wherein the managing center (MC) sends a new key Kn' to members of the same network Rn at a pseudo-random interval.

* * * * *